Patented Mar. 5, 1946

2,395,971

UNITED STATES PATENT OFFICE 2,395,971

DETERGENT COMPOSITION

Donald John Loder, Wilmington, Del., assignor to E. I. du Pont de Nemours & Company, Wilmington, Del., a corporation of Delaware No Drawing. Application February 20, 1942, Serial No. 431,711

5 Claims. (Cl. 252—161)

The invention relates to the manufacture of soaps, detergents, and the like, and to improvements in the treatment of liquids for use in the textile, leather, and allied industries. The invention likewise relates to the production of soap-like materials and other substances of like character having exceptional wetting, cleansing, and dispersing properties.

An object of the present invention is to provide soap-like materials from organic acids, anhydrides, esters, or their corresponding alcohols and amides which have been rendered water-soluble by the addition of ($-OCH_2OCH_2CH_2$) groups. Another object of the invention is to provide liquid detergents by the addition of 1,3-dioxolane groups to water-insoluble fatty acids, anhydrides, esters, alcohols, and amides containing at least six carbon atoms. Yet another object of the invention is to provide detergents which are effective in hard or salt water. Still another object is to provide processes for the preparation of these soap-like materials and likewise to provide the products thus obtained. Other objects and advantages of the invention will hereinafter appear.

In accord with the present invention water-insoluble organic acids, anhydrides, esters, alcohols, and amides, including those which may contain C—C unsaturated linkages and/or hydroxyl groups as well as the alcohols corresponding to the acids, wherein, in effect, the carboxyl groups thereof whether free or combined have been replaced with carbinol groups, can be converted to water-soluble soap-like products valuable for use as soaps, detergents, wetting agents, dispersing agents and the like by rendering them water soluble through the addition of 1,3-dioxolane groups.

It has been found that these valuable products can be obtained by introducing into any of the above-designated water-insoluble organic compounds, all of which (with the exception of the esters) may be generically called hydrophobic organic compounds containing a reactive hydrogen atom, at least five 1,3-dioxolane residues which may be designated by the formula

The addition is effected by intimately mixing the hydrophobic compound with the appropriate amount of 1,3-dioxolane and a suitable catalyst and allowing the resulting reaction to continue until the desired degree of water solubility, and/or the desired physical state of the soap-like material is produced.

The organic acids which may be modified in order to make the valuable soap-like materials include the aliphatic carboxylic acids which are insoluble in water such as those containing at least six carbon atoms and especially the saturated, unsaturated, and/or hydroxylated carboxylic acids of animal and vegetable origin and other mono or polycarboxylic acids containing more than six carbon atoms as, for example, caproic acid, lauric acid, oleic acid, ricinoleic acid, linoleic acid, palmitic acid, stearic acid, montanic acid, naphthenic acid, myristic acid, abietic acid, and rosin acids generally.

Anhydrides, esters, amides, and alcohols corresponding to these acids may likewise be employed. Mixtures of these derivatives may be used as well as, for example, the analogous synthetic mixtures obtainable by the destructive oxidation of paraffin wax or paraffin oil or like non-aromatic high molecular hydrocarbons and fractions of such oxygenated products or the acids or waxes of vegetable and mineral origin, such as, bees-wax, montan wax, and carnauba wax.

The acid modified soap-like products obtained by introducing the 1,3-dioxolane residues into the carboxylic acid correspond to the general formulas:

(1) $RCO(-OCH_2OCH_2CH_2-)_xOR'$ and/or

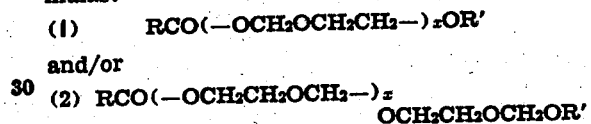

in which RCO is the acyl radical of the carboxylic acid containing at least six carbon atoms, R' is hydrogen or an alkyl, and $x$ is at least five.

Instead of the organic acids, their anhydrides or esters above enumerated, alcohols containing at least six carbon atoms and especially those corresponding to or prepared by the reduction of the aforementioned carboxylic acids or their glycol or glyceryl esters may be employed, such, for example, as: hexyl alcohol, octyl alcohol, decyl alcohol, undecyl alcohol, dodecyl alcohol, tetradecyl alcohol, octyldecyl alcohol, cetyl alcohol, oleyl alcohol, and cholesterol.

Other alcohols which may be employed include, by way of example, those obtained by the catalytic hydrogenation of the free fatty acids of coconut oil which comprise mainly lauric acid alcohol, myristic alcohol, cetyl alcohol, and stearic alcohol; alcohols obtained by the catalytic hydrogenation of palm kernel oil, ucuhuba fat, and those obtained by the saponification of spermacetic, sperm oil, bees-wax, linoleic alcohol (obtained by reduction of linoleic acid by means of sodium and ethyl alcohol); alcohols obtained by catalytic reduction of tallow or the free fatty acids of tallow; and those obtained by the catalytic hydrogenation of free fatty acids of coconut oil, palm kernel oil, olive oil, and the like; and the higher molecular weight alcohols obtained by the catalytic hydrogenation of carbon oxides under elevated temperatures and pressures. The oils themselves may be converted to valuable detergents and like products by treatment in accord with the invention with 1,3-dioxolane. Glycols of high molecular weight of the type of octadecanediol, such as octamethylene glycol, decamethylene glycol, as well as water-insoluble alkyl, cycloalkyl, aralkyl, or aryl unsymmetrical ethers of polyhydric alcohols as, for example, cresylic, phenylic, benzylic, cyclohexylic, and naphthylic ethers of glycol or glycerol may also be used. The soap-like products obtained by introducing the 1,3-dioxolane residues into the said alcohols correspond to the general formula:

(3)  $C_nH_{2n+1}(-OCH_2OCH_2CH_2-)_xOH$
(4)  $C_nH_{2n+1}(-OCH_2OCH_2CH_2-)_xOH$ in which $n$ is at least six and $x$ is at least five.

The 1,3-dioxolane radicals may be added to the above designated materials by treatment with a suitable amount of 1 3-dioxolane or substances which under the conditions of the reaction form 1,3-dioxolane. In accord with the alternate method of preparing the modified products the organic compounds to be modified may, for example, be reacted with a mixture of formaldehyde and a vicinal glycol, that is, a glycol containing hydroxyl groups on adjacent carbon atoms. In this manner, for example, stearic acid may be reacted with a mixture of ethylene glycol and formaldehyde in the presence of an acidic type catalyst such as sulfuric acid, phosphoric acid, and the like, or the other catalyst given below, and the reaction continued during which it is preferable to remove the water formed during the course of the reaction particularly if a large number of dioxolane groups are to be added to the compound treated. Similarly, such reactions can be carried out between the organic compound, an acetal, and more particularly the formals and a vicinal glycol. Furthermore, as the reaction of formaldehyde or formals with vicinal glycols gives glycol formal polymers which will react similarly to 1,3-dioxolane to give the residue—$OCH_2OCH_2CH_2$—, glycol formal polymers may be substituted for 1,3-dioxolane in the preparation of the products of the invention. Moreover, 1,3-dioxolane reacts with many compounds such as acids, esters, amides, olefines, ketones, aldehydes, etc., to form polymers with these compounds. In lieu of making the detergent by adding, for example, the fatty acid to 1,3-dioxolane, the aforesaid polymers of organic compounds and 1,3-dioxolane may be used; in such a case it will be necessary in order to give the desired solubility to select a polymer which contains sufficient 1,3-dioxolane molecules or groups to impart the desired solubility to the resulting detergent.

The reaction can be effected at temperatures ranging between —80 and 300° C. and preferably between 0 and 150° C. Atmospheric, sub- or superatmospheric pressures may be used and if the last, pressures may range from 1 to 1000 atmospheres or higher. Normally excellent results are obtained at or about atmospheric pressure. If desired, the temperature of the reaction, especially when carried out at the boiling point of the reaction mixture, may be controlled by varying the pressure of the boiling reactants.

It has been found advantageous to carry out the reaction in the presence of an acidic type catalyst such, for example, as sulfuric acid, phosphoric acid; the halogen acids, such as hydrochloric acid, hydrofluoric acid (alone or with boron trifluoride), boron fluoride (including its complexes with water, acids, esters, alcohols, and the like), paratoluene sulfonic acid, camphor sulfonic acid, and other acid catalysts of this general nature. Friedel Crafts type catalysts other than boron fluoride may be used such as aluminum chloride, aluminum bromide, ferric chloride, and so forth as well as inorganic acids generally and their acid salts, such as sodium acid sulfate, sodium acid phosphate, and so forth.

The reaction is preferably conducted until the desired number of dioxolane residues are attached to the organic compound. For example, if their water solubility is the determining factor, a sample may be removed from the reaction mixture, the modified fatty material separated and its solubility in water determined. Water solubility of soaps, detergents, wetting agents, and the like involves sufficient solubility to give the desired effect, e. g. detergents are employed in amounts ranging between 0.05 and 50% and consequently a modified fatty material need, for such purposes, be solubilized to give a product soluble to that extent although greater solubility can be effected if desired. If a solid cake rather than water solubility is the desired end point, samples are removed from the reaction mixtures until on cooling the product is found to be a solid of the desired hardness and/or firmness. Generally speaking, it has been found that water solubility is obtained when upon analysis it is found that in the order of five 1,3-dioxolane residues are combined with the fatty or other materials, while a solid cake is not obtained until in the order of fifteen to forty-five or more 1,3-dioxolane residues are combined. When the desired number of residues have been combined, the reactions may then be stopped by destroying the catalyst. This may be done by removing it or by treating the reaction mixture with an inorganic base, such as ammonia, alkali metal and alkaline earth metal hydroxides, carbonates, alkoxides, and so forth or an organic base, such as pyridine, dimethyl amine, and the like. These bases are added in sufficient amounts to neutralize the catalyst and when acid catalysts are used and the unconverted reactants may be removed by distillation under reduced pressures. As soon as the catalyst has been neutralized, the reaction ceases. The neutralized catalyst may be filtered off and the water-soluble product which remains separated.

The separation is carried out by treating the reaction product with a saturated cyclic or acyclic aliphatic hydrocarbon such as cyclohexane, solvent naphtha, gasoline, etc., for the removal of the water-insoluble products which may be present. For example, the reaction product may be treated with once or twice its weight of n-hexane, followed by two successive extractions with equal weights of n-hexane. The hexane is separated by decantation and will contain the major portion of the water-insoluble fraction. The residue from the n-hexane extraction is freed from n-hexane by heating under low pressures. The residue is the water-soluble product.

It has been stated that the modified products are obtained principally by reacting the compound to be modified with 1,3-dioxolane or similar compounds in the presence of an acidic catalyst. The modified products can also be made by alcoholysis of the esters of the acids to be modified. By this route the organic acid ester is treated with 1,3-dioxolane, the glycol formal polymer, or an organic compound-1,3-dioxolane polymer, the reaction in this case being carried out under alcoholysis conditions and in the presence of a neutral or basic catalyst such, for example, as sodium methoxide or other alcoholysis catalysts such as sodium ethoxide, sodium glyceroxide and alkali metal alcoholates generally; sodium hydroxide, zinc oxide, calcium oxide, litharge; and mixtures of such catalysts.

The products of the invention may be used alone or together with other agents such as alkali metal, ammonia, or amine soaps or soap-like substances, for example, sulfonic acid derivatives of high molecular weight aliphatic or aromatic hydrocarbons, which may also contain hydroxy and/or carboxyl groups or sulfuric acid esters of high molecular weight alcohols, vegetable or animal fats, oils, natural and synthetic waxes or cellulose ethers or esters.

Furthermore, inasmuch as the 1,3-dioxolane modified acids and alcohols in many instances do not foam as vigorously as the fatty acid soaps, it has been found desirable to have incorporated from 5 to 50% of a suitable foaming agent such as the sulfonated higher fatty alcohols, soaps, Turkey red oils, saponine, organic aliphatic or aromatic sulphonic acids or other suitable foaming agents. Other additive agents may likewise be employed to improve the utility, appearance and acceptability of the soap-like products and as examples of such materials may be given pumice, rouge, chalk, mild acting abrasives, coloring materials, germicides, perfumes, and the like.

Examples will now be given illustrating preferred embodiments of the invention but it will be understood that it is not to be limited by the details thereof. Parts are by weight unless otherwise indicated.

*Example 1.*—A reaction mixture consisting of 186 parts of lauryl alcohol, 444 parts of 1,3-dioxolane and 0.63 part of fuming sulfuric acid (25% sulfur trioxide) was heated on a steam bath under a return condenser equipped with a calcium chloride drying tube, to prevent direct contact of the refluxing vapors with air, for 8.5 hours. Subsequent to cooling the somewhat viscous liquid reaction mixture was neutralized with anhydrous ammonia, followed by 0.9 part of sodium hydroxide in 5 parts of water. Removal by distillation of unconverted 1,3-dioxolane to 120° C. and 1 mm. pressure gave 492 parts of a viscous liquid. This lauryl alcohol-1,3-dioxolane polymer was not miscible with water. Extraction with 1500 parts of n-hexane followed by two 500 part portions gave 158.2 parts of a light straw colored, slightly viscous liquid which was insoluble in n-hexane but miscible with water. Agitation of aqueous solution produced excellent foam.

*Example 2.*—To 296 parts of 1,3-dioxolane was added 13.32 parts of lauric acid, 5 parts of powdered anhydrous potassium bisulfate and 1.52 parts of sulfuric acid. The resulting mixture was heated with agitation for 5 hours on a steam bath under a return condenser supplied with a calcium chloride drying tube. The cooled viscous reaction mixture was treated with 2.79 parts of sodium hydroxide dissolved in 10 parts of water. Removal by distillation of unconverted 1,3-dioxolane to 120° C. and 1 mm. pressure gave 247.7 parts of a practically colorless solid melting at 46–53° C. Solutions of this material in water exhibited strong surface-active properties.

*Example 3.*—A reaction mixture consisting of 176 parts of a glycol formal polymer (obtained by reacting ethylene glycol with formaldehyde in the presence of sulfuric acid, while removing the water as formed by distillation) having an average molecular weight of 353, 107 parts of methyl laurate, 1.8 parts of lead oxide and 0.9 part of zinc oxide was heated at 150° C. with good stirring for 13 hours. While still warm the reaction mixture was filtered to remove the insoluble lead oxide-zinc oxide catalyst. The filtrate was a tan colored, viscous liquid not completely miscible with water. This lauric acid-glycol polyformal ester was extracted five times with 300 part portions of n-hexane. There remained 140 parts of a tan colored viscous oil which was insoluble in n-hexane but completely miscible with water. Agitation of the aqueous solutions produced foaming.

*Example 4.*—A reaction mixture consisting of 207 parts of a glycol 1,3-dioxolane polymer having an average molecular weight of 1930, 42.8 parts of methyl laurate, 2.5 parts of lead oxide, and 1.2 parts of zinc oxide was heated at 150 to 170° C. with good stirring for 13 hours. While still hot the reaction mixture was filtered to remove the insoluble lead oxide-zinc oxide catalyst. The filtrate was extracted five times with 200 part portions of n-hexane. There remained 137 parts of a lauric acid-glycol polyformal ester which on cooling solidified to a material melting at 45 to 48° C. The product dissolved almost completely in water to give a solution which foamed when agitated.

*Example 5.*—A mixture of 32 parts lauric acid, 296 parts 1,3-dioxolane and 0.09 part of anhydrous boron trifluoride was heated for 20 hours on a steam bath under a return condenser protected from the air with a calcium chloride drying tube. The reaction mixture was allowed to stand for 5 days at 20–25° C., followed by 6 days at 6° C. The product was dissolved in twice its volume of warm benzene containing 5 parts of pyridine to neutralize the catalyst. Benzene and unreacted 1,3-dioxolane were removed at 1 mm. pressure and 100° C. 170 parts of a light cream colored solid melting at 42–47° C. were obtained. The product was soluble in water and its aqueous solutions exhibited surface-active properties.

*Example 6.*—A mixture of 56.8 parts stearic acid, 296 parts 1,3-dioxolane and 0.9 part of anhydrous boron trifluoride was heated for 5 hours on a steam bath and allowed to stand 5 days at 25° C. The reaction mixture was dissolved in twice its volume of benzene containing pyridine in slight excess of that required to neutralize the catalyst. The benzene and unreacted dioxolane were removed at 1 mm. at 100° C. 282 parts of a cream colored solid melting at 48–58° C. were obtained. This product was not completely soluble in water. The insoluble portion was removed by extracting twice with equal volumes of cyclohexane. The water soluble portion showed good surface-active properties.

*Example 7.*—A mixture comprised of 32 parts of coconut oil acids, 296 parts of 1,3-dioxolane and 0.19 part of anhydrous boron trifluoride was heated for 30 hours on a steam bath and then allowed to stand 5 days at 25° C. and 4 days at 6° C. The product was dissolved in twice its weight of benzene containing 5 parts of pyridine to neutralize the catalyst. The benzene and unreacted 1,3-dioxolane were removed at 1 mm. pressure at 120° C. 274 parts of a light colored solid were obtained melting at 35–41° C. The product was soluble in water and aqueous solutions of the material gave excellent foam on agitation.

Example 8.—A mixture of 75 parts of amidated hydrogenated cottonseed oil (prepared by processing the hydrogenated cottonseed oil with anhydrous ammonia at 150–157° for 3 hours under pressure and removing excess ammonia), 740 parts of 1,3-dioxolane and 3.5 parts concentrated sulfuric acid was heated 9.5 hours on the water bath. The catalyst was neutralized with ammonia, followed by 3.1 parts of sodium hydroxide in 20 parts of water. Unreacted 1,3-dioxolane was removed at 1 mm. at 100° C. 563 parts of a light brown, viscous liquid product were obtained. The material was soluble in water and aqueous solutions exhibited surface-active properties.

Example 9.—A mixture of 82 parts of ethyl-12-hydroxy-stearate, 740 parts of 1,3-dioxolane and 4 parts of concentrated sulfuric acid was heated 4 hours on a steam bath. The catalyst was neutralized with anhydrous ammonia, followed by 3.4 parts of sodium hydroxide in 12 parts of water. Unreacted 1,3-dioxolane was removed at 1 mm. at 100° C. 647.4 parts of a light brown, viscous liquid were obtained. The product was soluble in water.

The above examples describe various methods of modifying compounds to render them water soluble and inasmuch as these water-soluble compounds are primarily of interest in the preparation of detergents, wetting and dispersing agents, etc., their use for these purposes is more specifically described by the following examples:

Example 10.—A solid cake was prepared by heating together a mixture containing, in parts by weight, 85 parts of modified lauric acid obtained in accord with the process of Example 2, 10 parts of sodium laurol sulfate and 5 parts of water. Upon cooling the solid was formed into cakes of the size suitable for domestic use. This cake was found to be very efficient for cleansing textiles, and for cosmetic uses.

Example 11.—A cake detergent was made in accord with the process of Example 10 from 90 parts of the solid 1,3-dioxolane modified lauric acid and 10 parts of sodium laurol sulfate.

Example 12.—A cake detergent was made in accord with the process of Example 10 employing 70 parts of the solid dioxolane modified lauric acid prepared in accord with Example 2 and 30 parts of sodium laurol sulfate.

In preparing the solid cakes a satisfactory product can be made by mixing from 60 to 95 parts of the solid 1,3-dioxolane modified acid, anhydride, ester, amide, or alcohol with 40 to 5 parts of a sudsing agent such, for example, as the sulfonated higher fatty alcohols, soaps, Turkey red oils, saponin, and the aliphatic organic or aromatic sulfonic acids.

The solid and liquid detergents of the invention are non-polar, surface-acting agents and are generally applicable for use where agents of this nature are required.

In cotton and linen processing the products of the invention are particularly useful for wetting of raw stock to reduce fly in carding; in wetting out of skeins, packages, beams, warps, and chain warps; as wetting agent for dyeing with inorganic salts as iron and chromium salts; and as agents to increase the absorbency of towels, face cloths, mops, and cleaning cloths generally. In the cotton and linen processing they are likewise applicable for use as assistants in, oiling of raw stock, kier boiling, and bleaching; as penetrants in mercerizing caustic solutions; as assistants in shrink setting finishing; as aids in dyeing; and as dispersing agents for vat and sulfur dyes.

In wool processing these compounds are particularly adapted for raw wool scouring; as ingredients of fulling soap to aid rinsing and of mineral oil to improve removal from fabric; as assistants in carbonizing, to improve neutralization after carbonizing, in acid fulling, in Vigoreaux printing, in dyeing with wool colors, in felting, and in dyeing of hat felts; and they may likewise be used in the finishing of wool to give soft hand.

The detergents of the application are likewise suitable for use in rayon processing and may be used as assistants to aid in improving penetration in regenerated cellulose process rayon manufacture; as assistants for desulfurizing rayon; as agents to prevent crater formation in spinnerets, use in nylon and regenerated cellulose process spinning; as penetrants for rayon size; as assistants for crepeing and finishing woven and knit goods, and for use in dyeing with all types of colors.

In the cellulose acetate, regenerated cellulose, silk, nylon and the artificial filament and fabric processing the products of the invention may be employed as assistants in soaking of raw fibers, in degumming of silk, in tin weighting and silicating of silk, and in removal of oil and graphite stains as well as kaumagraph marks. They likewise may be used in the conditioning of silk, dyeing of silk and polyamides, and in the conditioning of silk, dyeing of silk and polyamides, and in the rewetting of splash proof hose prior to boarding.

In the processing of other fibers they are likewise useful in scouring and dyeing of jute, straw, and hair; as penetrants of straw hats for bleaching; as aids in feather washing; as penetrants of "Cellophane" wrapped straws; and as dispersing agents for resins in moth-proofing compounds.

In the manufacture of leather the products may likewise be used as assistants in solvent degreasing of skins, in the bateing process, in leveling and dyeing as penetrants, in fat liquoring of leather, in alum or in chrome and alum treatments of white leather; as wetting agents in the glazing of skins for recoloring and for the treatment of back dried skins and crusted leather; in the cleaning of leather prior to tanning; and as agents for solubilizing and dispersing vegetable tanning materials. In the fur industry, the products may be used as assistants in dyeing with intermediates; and as oxidizing agents, in alum tannage of skins, and in degreasing of skins with solvents.

In the petroleum industry, the products of the invention may be used as penetrants in acid treatment of oil wells; as assistants in flooding waters for recovery of petroleum from oil bearing sands; and as assistants in breaking crude oil-brine emulsions.

For use in the paper industry, the products may be employed as assistants in, cooking rags, better sizing with clay and alum, calender sizing and coloring, making transparent or glassine paper, and preparing fireproof paper. They may be used in washing of paper and board mill felts; in neutral, alkaline, and acid washing baths in treating mill felts; as agents in the de-inking of paper stock; and to increase absorbency of paper towels, blotting papers, facial tissue, and the like; and as a pitch dispersing agent for beaters.

In the metal industry the detergents may be used as wetting agents for acid and alkaline cleaning with or without solvent emulsions, and especially for use prior to enameling and lacquering; as wetting agents in lime baths to quench the pickle. They may be used as assistants to remove drawing grease from small metal parts, in wire drawing, in electrolytic pickling baths especially to give a foam blanket therein; as addition agents to lime for drawing steel bars; as ingredients in buffing compounds, sodium silicate flux for welding rods, and soldering fluxes generally; as addition agents in electroplating baths, such as, nickel, tin, copper, gold, silver, zinc and cadmium; as anti-pitting agents for bright nickel and bright copper plating; and as emulsifying agents for coating aluminum with wax.

In the paint industry, the products are applicable for use as ingredients in casein cold water paints, lacquer emulsions, such as nitrocellulose emulsions, caustic paint stripping baths, and lacquers to prevent blocking off of paper; as wetting agents for wet sanding automobile body finishes; and as assistants in metallized surface coating, especially of paper.

In the laundry and dry cleaning industry and for such uses generally the water-soluble polymers are particularly applicable for use as wetting agents and detergents and may be used in washing compositions for use on automobiles, busses, railroad cars, and the like, and as wetting agents generally. They may also be used for acid cleaning of bricks; as foaming agents for household hypochlorite bleach; as cleaning agents for spun glass air filters; and as addition agents to soaps to give dispersion of the insoluble salts present or to prevent their formation. The products may likewise be used as ingredients in radiator cleaners, denture cleaners, shoe cleaners, dry cleaning soaps, dish washing compounds, household alkali cleaners, household ammonia, glass cleaners, spot removers, laundry blueing, sterilizing compounds for dish washing, paint cleaner, acid porcelain cleaners, and milk bottle cleaners for mechanical washers.

The products likewise have utility in agricultural uses and particularly as wetting agents in insecticidal and fungicidal sprays; as ingredients of acid or alkaline fruit washing compositions, especially for removing spray residues; and as emulsifying agents in all types of sprays.

In the cosmetic industry the surface acting, non-polar products of the invention may be employed as emulsifying agents in lotions and creams and as ingredients in brushless shaving cream, depilatory cream, hair wave lotion, foaming bath salts and water softeners, hair dye preparations, shampoos, bubble bath preparation, and in dentifrices of the liquid, paste or powder form.

The products of the invention may be used as wetting, dispersing, spreading, and emulsifying agents in the ceramic industry, for injection moulding mixes and in the preparation and use of paint, pigments, and pastes in printing, painting, etc., as assistants for pigment grinding with bentonite; as ingredients of cement to improve grinding and setting; as assistants in the preparation of slips of refractories; and as foaming agents to increase bulk in manufacture of mineral wool insulation, bricks, wall boards, and thermal insulation of cements. As dispersing and spreading agents they are especially useful in the preparation and use of dyes.

In the rubber industry the products of the instant case may be used as penetrants in acid processes for the reclaiming of rubber; as mould lubricants for rubber articles; as agents to prevent adhesion of milled rubber; as foaming agents in the manufacture of sponge rubber articles; and in latex compounding for: wetting of insoluble fillers, as channel black, clay, whiting, and blanc fixe; as an assistant in the incorporation of immiscible liquids in emulsion form; stabilization of latex emulsions against mechanical or chemical action; as plasticizers and softeners for rubber and elastomers generally and improving impregnation characteristics of rubber latex for use in the preparation of fabrics for coatings and the like.

The 1,3-dioxolane modified acids, esters, and anhydrides may be used generally as wetting agents for use in pigments, dry colors, embalming fluids, with calcium chloride for laying mine dust, in air-conditioning systems, photographic developer baths, in inks, in preventing fogging of safety glass, in wall paper removers, in household dye preparations, and as wetting agents for dry powdered foods such as baby foods and cocoa; in printing compositions for linoleum and in tobacco leaves, especially for use in cigar wrapper leaf. The products may likewise be employed as ingredients of printing ink for offset printing, in fly paper and fly killers, and in lacquer printing compositions. They may likewise be employed as assistants in settling inorganic slimes; for the control of crystal growth and formation of aggregates; for control of thixotropy in paints; for preservation of green fodder; as spreading agents in adhesive; as assistants in the preparation of lake colors; and for stripping dyestuffs from fibers; as assistants in rug shampoo; and as assistants in regenerating zeolite systems for soft milk, etching solutions for photo-engravers, and application to surfaces to give adherence to poured concrete. The products of the invention may likewise be used as dispersing assistants for pigments and printing inks; as foaming agents in air-foam type fire extinguishers; as penetrants in the manufacture of asphalt roofing paper; as ingredients in wood stains, and in creosoting liquors for use in preserving wood; and as emulsifying agents they are suitable for use in the dispersion and extension of oils and waxes; as polishers; as emulsifying agents in salad dressings, as flotation agents in ore treatment; as assistants in drilling muds to control thixotropy and settling properties; as a dispersing or sequestering agent for iron, chromium and aluminum salts in leather processing, as leather softeners for cellulose nitrate, cellulose acetate, cellulose aceto butyrate, polymeric methyl methacrylate, polymeric methylacrylate and other polymeric esters and interpolymers of acrylic and substituted acrylic acids, polyvinyl acetate, polyvinyl chloride and synthetic resins generally.

I claim:

1. A detergent composition consisting of in percentage by weight from 60 to 95% of a reaction product of 1,3-dioxolane with a water-insoluble hydrophobic organic oxygenated compound, which prior to the addition of the 1,3-dioxolane group contained a reactive hydrogen atom, and from 40 to 5% of a sudsing agent selected from the group consisting of sulfonated higher fatty alcohols, soaps, Turkey-red oil, saponin, aliphatic sulfonic acids and aromatic sulfonic acids.

2. A detergent composition in cake form consisting of in percentage by weight from 60 to 95% of a reaction product of 1,3-dioxolane with a water-insoluble hydrophobic organic oxygenated compound, which prior to the addition of the 1,3-dioxolane group contained a reactive hydrogen atom, and from 40 to 5% of a sudsing agent selected from the group consisting of sulfonated higher fatty alcohols, soaps, Turkey-red oil, saponine, and the aliphatic and aromatic organic sulfonic acids.

3. A detergent composition in cake form consisting of in percentage by weight from 60 to 95% of a solid reaction product of 1,3-dioxolane with lauric acid and from 40 to 5% of a sudsing agent selected from the group consisting of sulfonated higher fatty alcohols, soaps, Turkey-red oil, saponine, and the aliphatic and aromatic organic sulfonic acids.

4. A detergent composition in cake form consisting of in percentage by weight 85% of a solid reaction product consisting of lauric acid containing at least fifteen 1,3-dioxolane groups, 10% sodium lauryl sulfate and 5% water.

5. A detergent composition consisting of in percentage by weight from 60 to 95% of a solid reaction product of 1,3-dioxolane with lauryl alcohol and from 40 to 5% of a sudsing agent selected from the group consisting of sulfonated higher fatty alcohols, soaps, Turkey-red oil, saponin, aliphatic sulfonic acids and aromatic sulfonic acids.

DONALD JOHN LODER.